United States Patent
Souza et al.

(10) Patent No.: US 7,513,060 B2
(45) Date of Patent: Apr. 7, 2009

(54) LOFT AND LIE MEASUREMENT TOOL FOR GOLF CLUBS

(75) Inventors: John C. Souza, Phoenix, AZ (US); Lou C. Beebe, Phoenix, AZ (US); James Wells, Phoenix, AZ (US); John P. Fife, Jr., Phoenix, AZ (US); Ruben Viramontes, Phoenix, AZ (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 0 days.

(21) Appl. No.: 11/867,517

(22) Filed: Oct. 4, 2007

(65) Prior Publication Data
US 2008/0178483 A1     Jul. 31, 2008

Related U.S. Application Data

(60) Provisional application No. 60/886,763, filed on Jan. 26, 2007.

(51) Int. Cl.
G01B 5/24      (2006.01)
G01B 3/56      (2006.01)

(52) U.S. Cl. ...................................................... 33/508
(58) Field of Classification Search .................... 33/508
See application file for complete search history.

(56) References Cited

U.S. PATENT DOCUMENTS

| 2,546,426 | A | * | 3/1951 | Bryant | ........................ 33/508 |
|---|---|---|---|---|---|
| 4,094,072 | A | * | 6/1978 | Erb | ............................... 33/508 |
| 4,245,392 | A | * | 1/1981 | Heller | ........................... 33/508 |
| 4,620,431 | A | * | 11/1986 | Muldoon | ..................... 72/31.02 |
| 4,858,332 | A | | 8/1989 | Thomas | |
| 5,105,550 | A | * | 4/1992 | Shenoha | ........................ 33/508 |
| 5,327,766 | A | | 7/1994 | Humphreys | |
| 5,421,098 | A | | 6/1995 | Muldoon | |
| 5,884,409 | A | | 3/1999 | Muldoon | |
| 6,260,250 | B1 | | 7/2001 | Hall et al. | |
| 6,363,620 | B1 | | 4/2002 | Goodjohn | |
| 6,415,502 | B1 | | 7/2002 | Gunshinan et al. | |
| 6,430,829 | B1 | | 8/2002 | Williamson et al. | |
| 6,449,860 | B1 | * | 9/2002 | Nakai | ........................... 33/508 |
| 6,623,372 | B1 | | 9/2003 | Beebe et al. | |
| 6,871,414 | B2 | | 3/2005 | Burney et al. | |
| 7,164,473 | B2 | * | 1/2007 | Goodjohn | ............... 356/139.04 |

* cited by examiner

*Primary Examiner*—Christopher W Fulton
(74) *Attorney, Agent, or Firm*—Darrell F. Marquette

(57) ABSTRACT

A measurement tool for determining at least one of the loft angle or the lie angle of a golf club. The measurement tool includes a golf club head support structure having a mating surface and at least one beveled support element. The gauge also has a clamping tool capable securing the golf club head to the golf club head support structure. The clamping tool may include a pushing element and a mating element. The mating element has a jaw for applying a lateral force to the golf club head to secure it to the golf club support structure and a fastening plate for applying a vertical force to the golf club head to secure it to the golf club support structure. A gauge capable of indicating at least one of the loft angle or the lie angle of the golf club is positioned adjacent to the golf club head support structure.

16 Claims, 7 Drawing Sheets

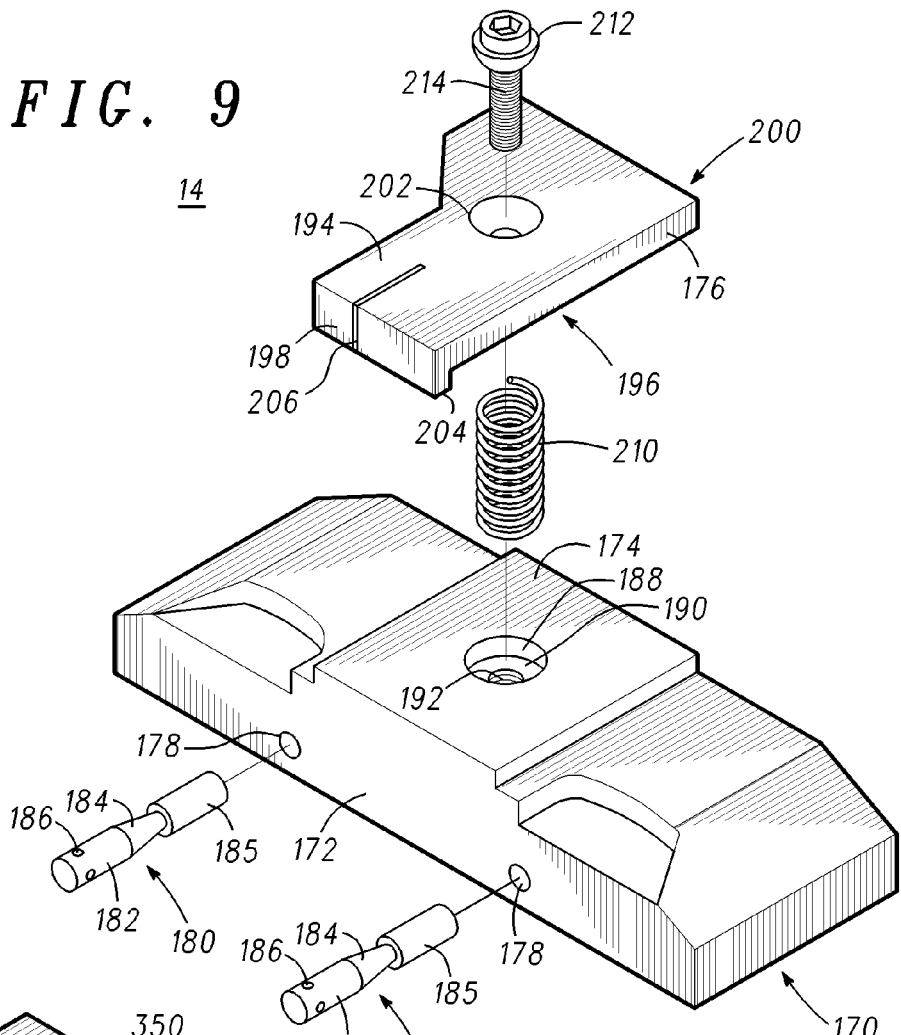
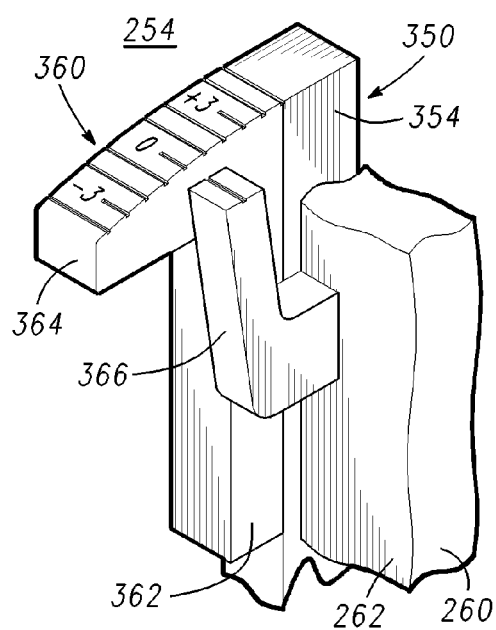
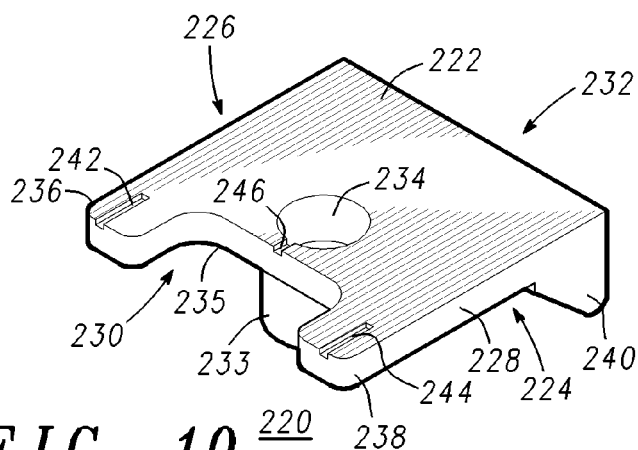

LOFT AND LIE MEASUREMENT TOOL FOR GOLF CLUBS

This is a nonprovisional application claiming the benefit of provisional application No. 60/886,763 filed Jan. 26, 2007.

BACKGROUND OF THE INVENTION

The present invention relates, in general, to golf equipment and, more particularly, to measuring the loft angle, the lie angle, or both the loft and lie angles of a golf club.

Fitting golf clubs to an individual golfer includes the consideration of several factors such as grip size, shaft length, swing weight, and loft and lie angular relationships of the golf clubs.

The loft angle of a golf club measured at its proper address position is the angle between a vertical plane and a plane that includes the face of the club head. Golf clubs having small loft angles are typically used for low trajectory-long distance golf shots, whereas golf clubs with large loft angles are typically used for high trajectory-short distance golf shots. The particular loft angle for each club in a set of golf clubs is not regulated by any standards or non-variable factors. Instead, the loft angles are normally predetermined by the designer of the clubs to achieve the desired performance characteristics for each club. The loft angles of the clubs are checked and may be adjusted by bending the clubs as needed to bring them into conformity with the manufacturer's predetermined angular values or to satisfy special requests that a golfer may make.

The lie angle of a golf club measured at its proper address position is the angle between the shaft axis and a line tangent to the center point on the sole of the club head. If the lie angle is too small for a particular golfer, the club head will be angled upwardly as it impacts a golf ball and may "hook" the golf ball to the left. Similarly, if the lie angle is too large for a particular golfer, the club head will be angled downwardly as it impacts a golf ball and may "fade" the golf ball to the right. The correct lie angle for an individual golfer is ideally determined by a trained fitting specialist, such as a Professional Golfer's Association ("PGA") professional, who watches the golfer's swing and can determine the correct lie angle by observing, among other things, the flight of the golf ball.

With properly fitted golf clubs, an individual golfer should be able to achieve optimum performance and shot reliability in accordance with his or her skill level. However, golf clubs can be knocked out of adjustment or the golfer's swing characteristics can change. When this occurs, the golfer's performance level will deteriorate and in many instances, the golfer will not realize that the golf clubs are at fault. Therefore the loft and lie angles of golf clubs should be periodically checked and adjustments made if needed.

When checking or making changes in the loft and lie angles of golf clubs either at the time of manufacture or during subsequent adjustments, the clubs are usually placed one at a time in a special holding fixture that is part of a bench mounted measurement and adjustment mechanism. Such mechanisms usually make accurate measurements and provide visual indications of the loft and lie angles of the club being held in the fixture. With the club still in the holding fixture, special tools are used to bend the club head into the desired angular relationships. However, such bench mounted measurement and adjustment mechanisms cannot be considered portable and only manufacturing or large well-equipped golf shops can justify the cost or dedicate the space required by these mechanisms.

Although portable gauges for measuring loft and lie angles have been available, they have been of limited benefit because they typically measure the loft and lie angles when the golfer is holding the club rather than the actual angular relationships of the golf clubs.

SUMMARY OF THE INVENTION

In accordance with one embodiment, the present invention includes a measurement tool for determining at least one of a loft angle or a lie angle of a golf club. The measurement tool includes a golf club head support structure having a mating surface and at least one support element having a beveled portion. The measurement tool further includes a clamping tool capable of securing the golf club head to the golf club head support structure. A gauge capable of indicating at least one of the loft angle or the lie angle of the golf club is mounted adjacent to the club head support structure In accordance with another embodiment, the present invention provides a tool for measuring at least one of a loft angle or a lie angle of a golf club. The tool includes a golf club support structure having a surface and a first opening extending from the surface into the golf club support structure. A first post having a beveled portion is positioned in the first opening and a clamping plate is coupled to the golf club support structure. The tool further includes a mating element capable of moving in the direction of the golf club support structure. A gauge for measuring at least one of the loft angle or the lie angle of the golf club is adjacent the golf club support structure.

DESCRIPTION OF THE DRAWINGS

FIG. 9 is an exploded perspective view of a portion of the loft and lie measurement tool of FIG. 1;

FIG. 10 is a perspective view of a loft and lie measurement tool in accordance with another embodiment of the present invention;

FIG. 12 is a cut-away perspective view of a portion of the loft and lie measurement tool of FIG. 1;

DESCRIPTION OF THE INVENTION

Figure 1:
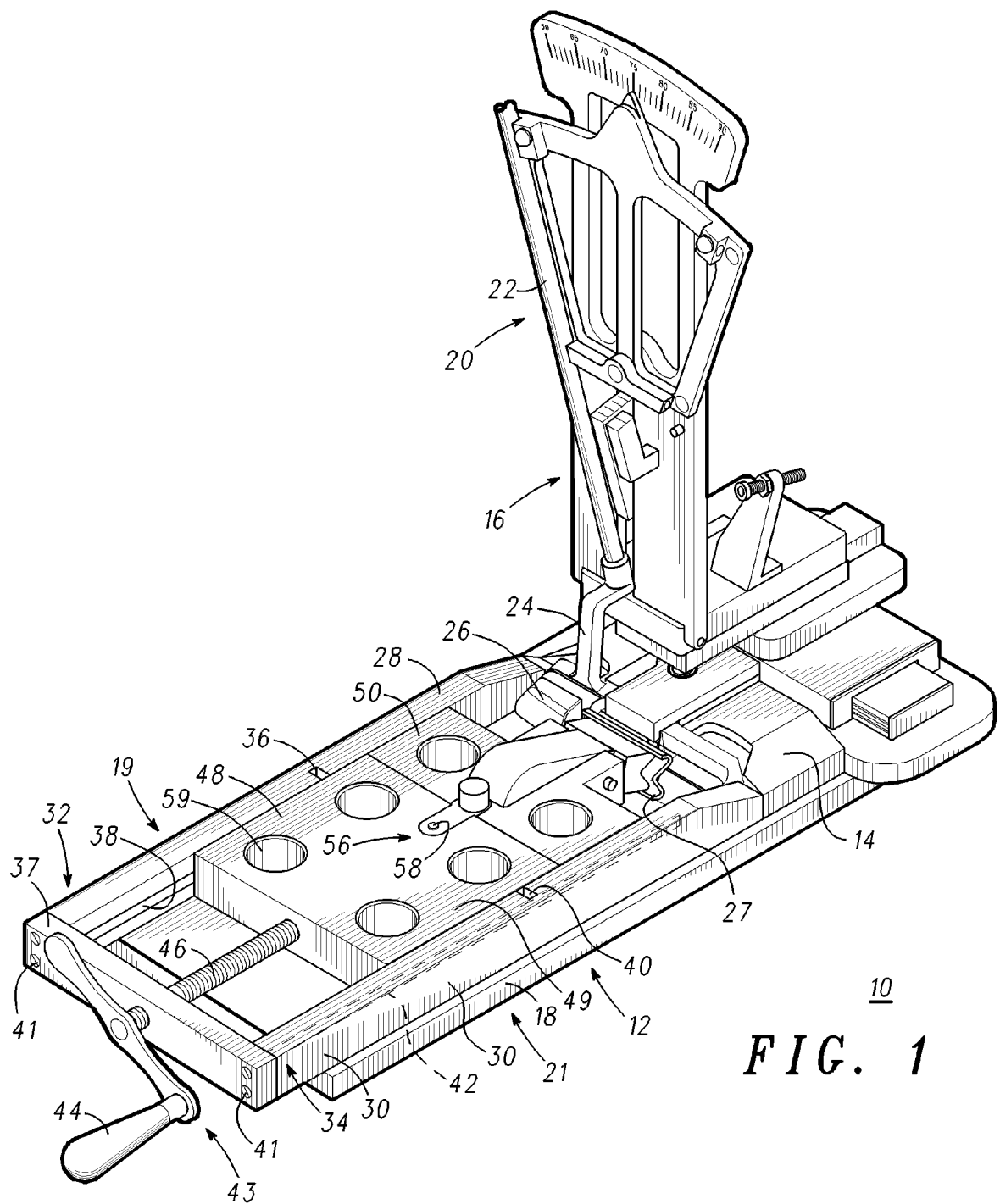
FIG. 1 is a perspective view of a loft and lie measurement tool in accordance with an embodiment of the present invention.

FIG. 1 is a perspective view of a loft and lie measurement tool 10 in accordance with an embodiment of the present invention. Loft and lie measurement tool 10 comprises a clamping tool 12, a club head support structure 14, and a gauge 16 mounted to a base 18. By way of example, base 18 is a rectangularly shaped aluminum plate having opposing sides 19 and 21, a width of about eight inches, a length of about fourteen inches, and a thickness of about one-half inch. Clamping tool 12 and club head support structure 14 are laterally spaced apart from each other. A golf club 20 having a shaft 22, a hosel 24, and a club head 26 is mounted on loft and lie measurement tool 10. More particularly, club head 26 is attached to club head support structure 14 and clamping tool 12 is pushed against club head 26 to secure club head 26 in position. When club head 26 is a putter head, club head support structure 14 is referred to as a putter head support structure. Club head support structure is also referred to as a golf club support structure. A protective insert or bumper 27 may be inserted between clamping tool 12 and club head 26 to protect club head 26. By way of example, protective insert 27 is made from an elastic material such as rubber. Gauge 16 is further described with reference to FIG. 11.

Still referring to FIG. 1, clamping tool 12 comprises a pushing element 48, a mating element 50, and side rails 28 and 30 mounted substantially parallel to each other on base 18. Side rails 28 and 30 have ends 32 and 34, respectively. Although ends 32 and 34 are shown as extending over an edge of base 18, this is not a limitation of the present invention. Side rails 28 and 30 have notches 36 and 40, channels or slots 38 and 42, respectively, and screw holes (not shown). For the sake of completeness, channel 42 is shown in phantom. An end rail 37 is fastened to ends 32 and 34 such that it is substantially perpendicular to side rails 28 and 30. End rail 37 may be fastened using screws, rivets, an adhesive material, or the like. End rail 37 is shown as being fastened to side rails 28 and 30 using screws 41. Loft and lie measurement tool 10 includes a crank 43 having a handle 44 and a threaded screw 46, which extends through a threaded screw hole in end rail 37 into pushing element 48.

Figure 2:
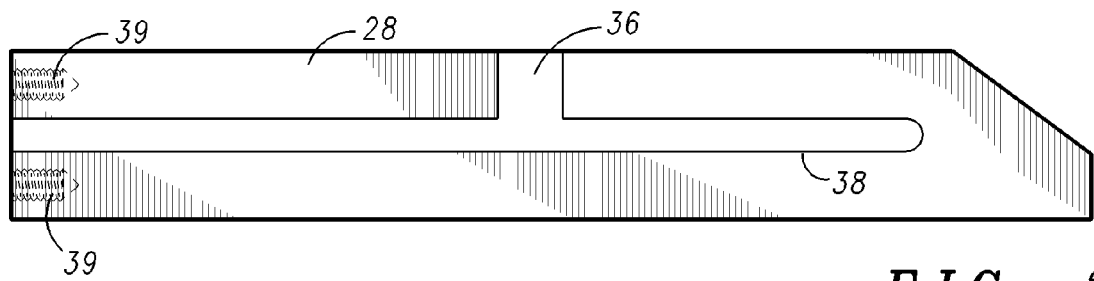
FIG. 2 is a side view of a portion of the loft and lie measurement tool of FIG. 1.

FIG. 2 is a side view of side rail 28 illustrating notch 36, channel 38, and screw holes 39. It should be understood that side rail 30 is similar to side rail 28 except that notch 40 and channel 42 are on the opposite sides compared with notch 36 and channel 38. In other words, when side rails 28 and 30 are mounted to base 18, the notches and channels in side rails 28 and 42 face each other. Screws 41 (shown in FIG. 1) are screwed into screw holes 39.

Figure 3:
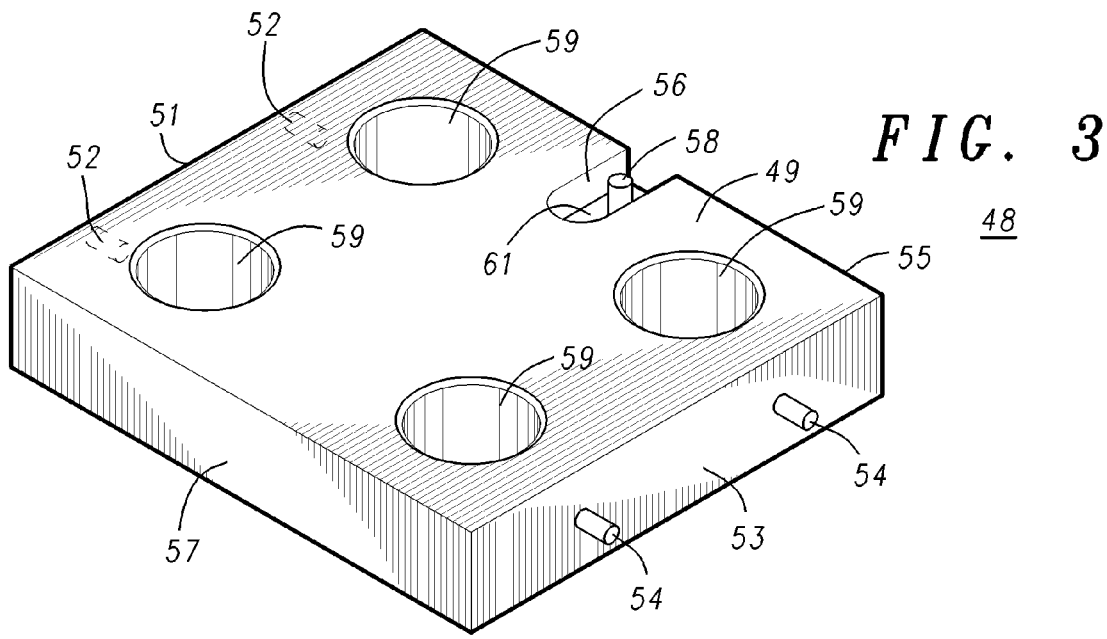
FIG. 3 is a perspective view of another portion of the loft and lie measurement tool of FIG. 1.

Referring now to FIG. 3, a perspective view of pushing element 48 is illustrated. Pushing element 48 has a cuboid shape with a top surface 49, opposing sides 51 and 53, and opposing sides 55 and 57. Guideposts 52 extend from side 51 and guideposts 54 extend from side 53 of pushing element 48. Guideposts 52 are shown in phantom. Guideposts 52 are inserted into channel 38 via notch 36 and guideposts 54 are inserted into channel 42 via notch 40. A notch 56 having a floor 61 extends from surface 49 into pushing element 48. A post 58 extends upward from floor 61 of notch 56. Optionally, openings 59 may be formed in pushing element 48 to decrease its weight. For the sake of clarity, surface 49, notch 56, post 58, and openings 59 have been shown in FIG. 1.

Figure 4:
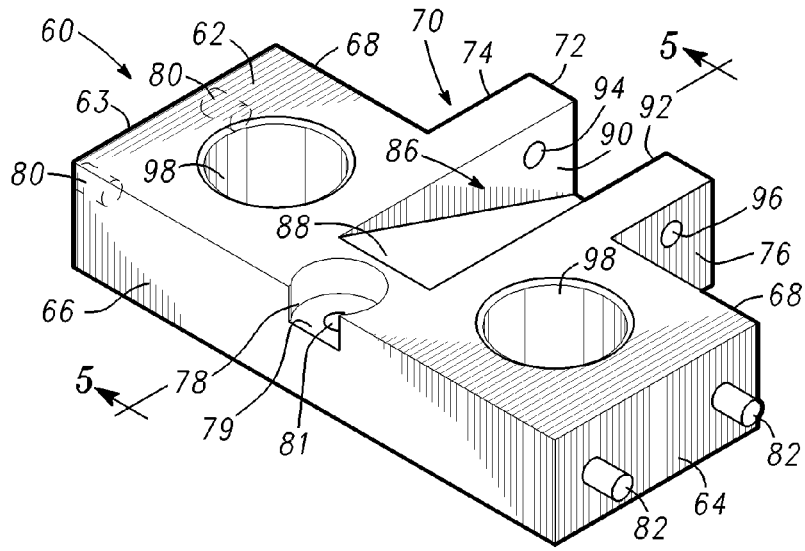
FIG. 4 is a perspective view of another portion of the loft and lie measurement tool of FIG. 1.

FIG. 4 is a perspective view of mating element 50 which comprises a rectangularly-shaped solid portion 60 having a major surface 62, opposing sides 63 and 64, and opposing sides 66 and 68. As those skilled in the art are aware, the term "solid" is used to describe a three-dimensional figure. Mating element is capable of moving in a direction of or towards golf club support structure 14. Mating element 50 further includes an extension portion 70 projecting from side 68, which side 68 us also referred to as a mating side. Extension portion 70 has sides 72, 74, and 76. Preferably, solid portions 60 and 70 are a unitary structure made from a single piece of metal such as, for example, aluminum. Thus, surface 62 extends from solid portion 60 to solid portion 70. Alternatively, solid portions 60 and 70 may be separate portions that are connected together. A notch 78 having a floor 79 extends from a portion of mating element 50 that is adjacent to side 66 into mating element 50. A mating hole 81 extends from floor 79 into mating element 50. Guideposts 80 and 82 extend from sides 63 and 64 respectively. Guideposts 80 are shown in phantom. Like guideposts 52 and 54, guideposts 80 and 82 mate with channels 38 and 42 in side rails 28 and 30, respectively. A beveled region or notch 86 having a beveled surface 88 and sides 90 and 92 extends from a portion of surface 62 into mating element 50 and continues to side 72. A hole 94 extends from side 90 to side 74 and a hole 96 extends from side 92 to side 76. Optionally, holes or openings 98 may be formed in mating element 50 to decrease its weight.

Figure 5:
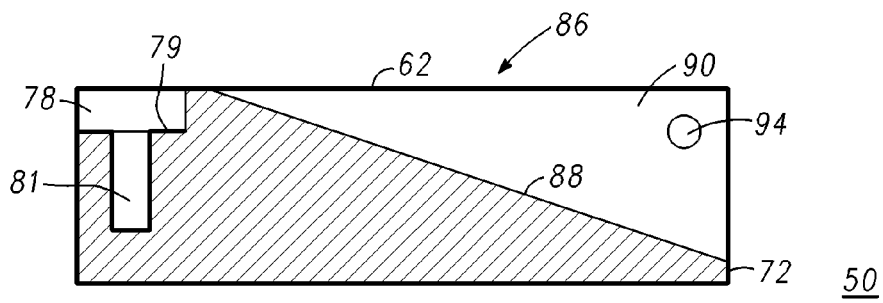
FIG. 5 is a cross-sectional side view taken along section line 5-5 of FIG. 4.

Briefly referring to FIG. 5, a cross-sectional side view of mating element 50 taken along section line 5-5 of FIG. 4 is illustrated. FIG. 5 shows surface 62, notch 78, floor 79, mating hole 81, side 72, and beveled notch 86 having beveled surface 88 and side 90. In addition, FIG. 5 shows hole 94 which extends from side 90 to side 74.

Figure 6:
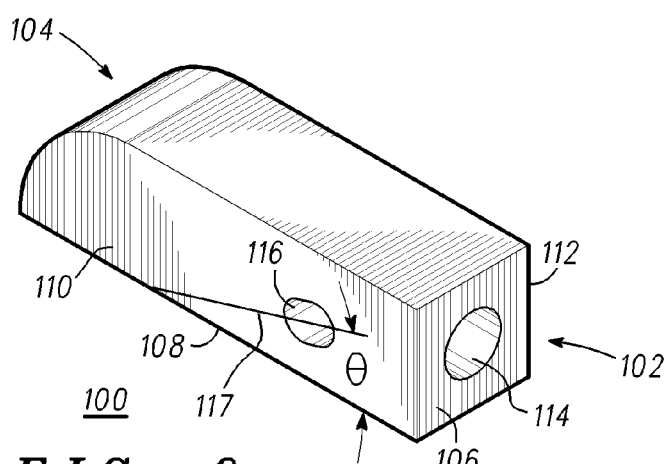
FIG. 6 is a perspective view of another portion of the loft and lie measurement tool of FIG. 1.

FIG. 6 is perspective view of a mating element extender 100 for use with mating element 50 in accordance with an embodiment of the present invention. Extender 100 comprises an end 102 having a rectangular solid shape, an end 104 having a curved or arcuate shape, an extender surface 106, a mating surface 108, and opposing sides 110 and 112. A mating hole 114 extends from mating surface 106 into extender 100. An elongated or oval shaped slot 116 extends from side 110 through extender 100 to side 112. Preferably, slot 116 is positioned such that an imaginary line 117 extending along the length of slot 116 makes an angle θ with surface 108. By way of example, angle θ ranges from about 10 degrees to about 20 degrees. An advantage of making slot 116 elongated and angled is that it allows adjusting mating element 50 for different heights and allows it to move in a direction perpendicular to surface 72, i.e., in the direction of or towards golf club support structure 14. Extender 100 is attached to mating element 50 by placing it in notch 86 such that elongated slot 116 is aligned with holes 94 and 96. After alignment, a pin (not shown) is inserted through opening 94, elongated slot 116, and opening 96. Extender 100 is capable of pivoting about the pin.

Figure 7:
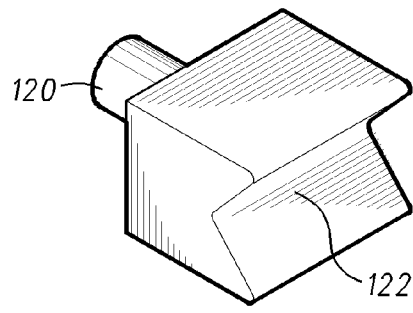
FIG. 7 is a perspective view of another portion of the loft and lie measurement tool of FIG. 1.

Briefly referring to FIG. 7, mating element 50 further comprises a clamping jaw 118 that may be connected to extender 100. Preferably, clamping jaw 118 is a unitary structure having a post 120 and a jaw 122. Post 120 is for inserting into mating hole 114.

Figure 8:
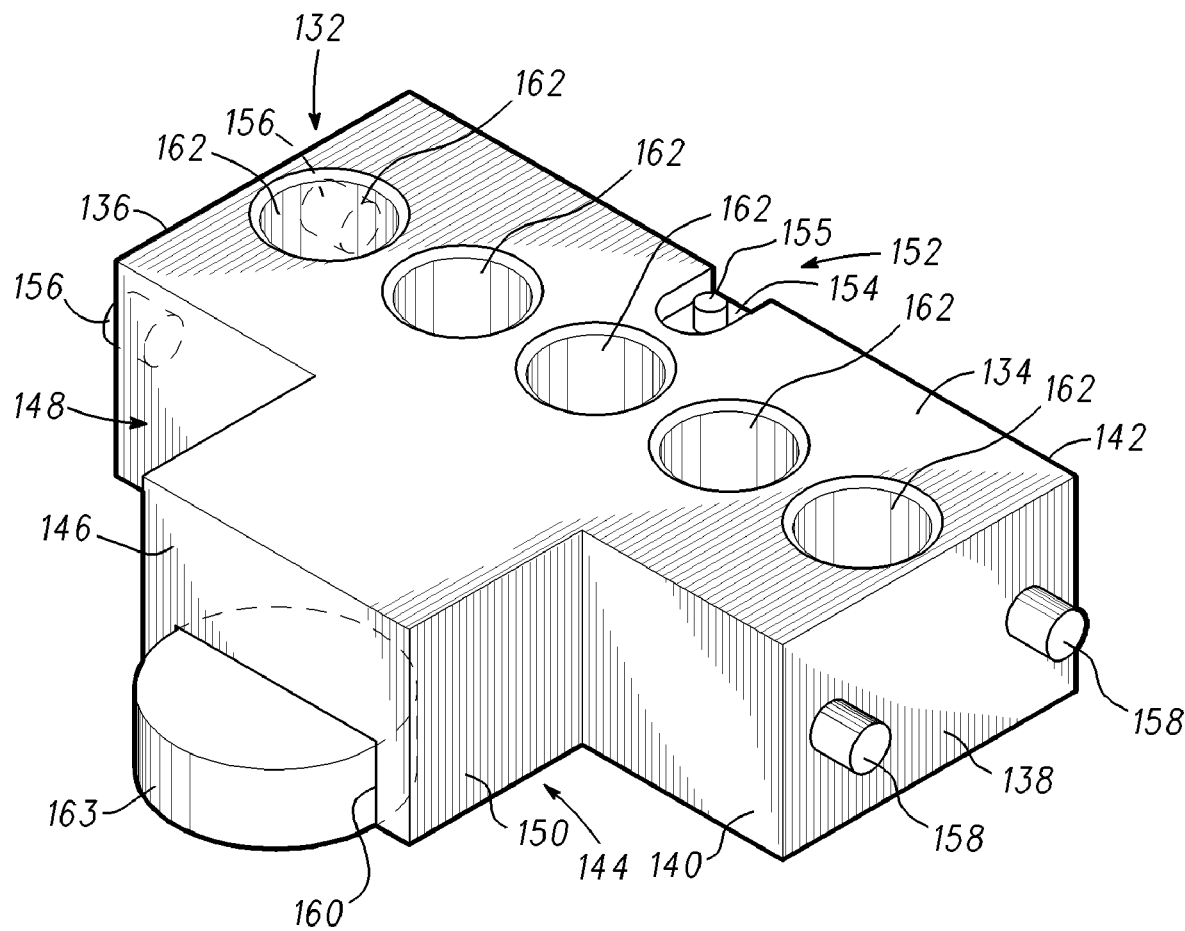
FIG. 8 is a perspective view of a loft and lie measurement tool in accordance with another embodiment of the present invention.

FIG. 8 is a perspective view of a mating element 130 in accordance with another embodiment of the present invention. Mating element 130 comprises a rectangularly-shaped solid portion 132 having a surface 134, opposing sides 136 and 138, and opposing sides 140 and 142. Mating element 130 further includes a rectangularly-shaped solid extension portion 144 projecting from side 140. Extension portion 144 has a side 146 and opposing sides 148 and 150. Preferably, solid portions 132 and 144 are a unitary structure made from a single piece of metal such as, for example, aluminum. Thus, surface 134 is common to solid portions 132 and 144. It should be understood that solid portions 132 and 144 may be separate portions that are connected together. A notch 152 having a floor 154 extends into mating element 130. A mating post 155 extends from floor 154. Guideposts 156 and 158 extend from sides 136 and 138, respectively. Guideposts 156 are shown in phantom. Like guideposts 52 and 54, guideposts 156 and 158 mate with channels 38 and 42 in side rails 28 and 30, respectively. A notch 160 extends from a portion of side 146 into rectangularly-shaped solid extension portion 144. When mating element 130 is used, a circular mating piece 163 extends into notch 160 for contacting the golf club head. Mating piece 163 is preferably made from a material that does not damage the golf club head such as, for example, tetrafluoroethylene, also known as Teflon, which is a registered trademark of E. I. DuPont de Nemours Company.

Optionally, holes 162 may be formed in mating element 130 to decrease its weight.

Referring now to FIG. 9, an exploded perspective view of club head support apparatus 14 is illustrated. Club head support apparatus 14 comprises a support structure 170 having a club head mating surface 172, a platform 174, and a fastening plate 176. Club head support apparatus 14 is also referred to as a golf club head support structure. Support structure 170 may be fastened to base 18 (shown in FIG. 1) using screws. Openings 178 that are laterally spaced apart from each other extend into support structure 170 from mating surface 172. Support elements or posts 180 are for inserting into openings 178. By way of example, support elements 180 have beveled portions 184 between cylindrical or barrel shaped portions 182 and 185. Beveled portions 184 have beveled angles that cooperate with an angle of the foot of a club head to form a substantially uniform contact between the club head and support elements 180. Optionally, support elements 180 have holes 186 that allow them to be easily rotated while they are in openings 178. Rotating support elements 180 provides a means for inhibiting and possibly preventing beveled portions 184 from becoming flat due to wear. In addition, rotating support elements 180 helps to maintain the bevel at the desired angle. The number of openings 178 and the number of support elements 180 are not limitations of the present invention. There may be one, two, three, or more openings 178 and support elements 180.

An opening or hole 188 having a floor 190 extends from platform 174 into support structure 170. A screw hole 192 extends from floor 190 into support structure 170.

Fastening plate or clamping plate 176 has opposing surfaces 194 and 196, opposing sides 198 and 200, and a beveled opening 202 extending from surface 194 to surface 196. A portion 204 of side 198 extends below surface 196 to form a keeper for keeping or holding club head 26 (shown in FIG. 1) against mating surface 172. An alignment aid 206 is formed in surface 194 and side 198. Fastening plate 176 is attached to support structure 170 by placing a spring 210 into opening 188 and placing an elongated beveled brass ring 212 into beveled opening 202. Fastening plate 176 is positioned such that beveled opening 202, spring 210, and opening 188 are aligned. A fastener such as, for example, a screw 214 is inserted through beveled brass ring 212, beveled opening 202, spring 210, opening 188, and into screw hole 192. Screw 214 is then screwed into screw hole 192. Fastening plate 176 cooperates with opening 202, spring 210, and opening 188 to form a spring mounted retainer. Because of spring 210 and beveled brass ring 212, fastening plate 176 can pivot about screw 214. It should be understood that fastening plate 176 has a notched area for accommodating right handed clubs. Fastening plate 176 can be modified to accommodate left handed clubs by forming the notched area from its other side.

FIG. 10 illustrates a fastening plate 220 for use with golf clubs having shafts extending from a central portion of the club head. These types of clubs are also referred to as center-shafted golf clubs. Fastening plate 220 has opposing surfaces 222 and 224, opposing sides 226 and 228, and opposing sides 230 and 232. A cylindrical extension 233 extends away from surface 224. An opening 234 extends from surface 222 through fastening plate 220 and through cylindrical extension 233. The shape of extension 233 is not a limitation of the present invention, i.e., it can have an oval shape, a polygonal shape, etc. A notch 235 extends from side 230 into fastening plate 220 and forms arms or extensions 236 and 238. A portion 240 of side 228 extends below surface 224. Alignment aids 242 and 244 are formed in extensions 236 and 238, respectively, and an alignment aid 246 extends from notch 234. Fastening plate 220 can be used in place of fastening plate 176.

Figure 11:
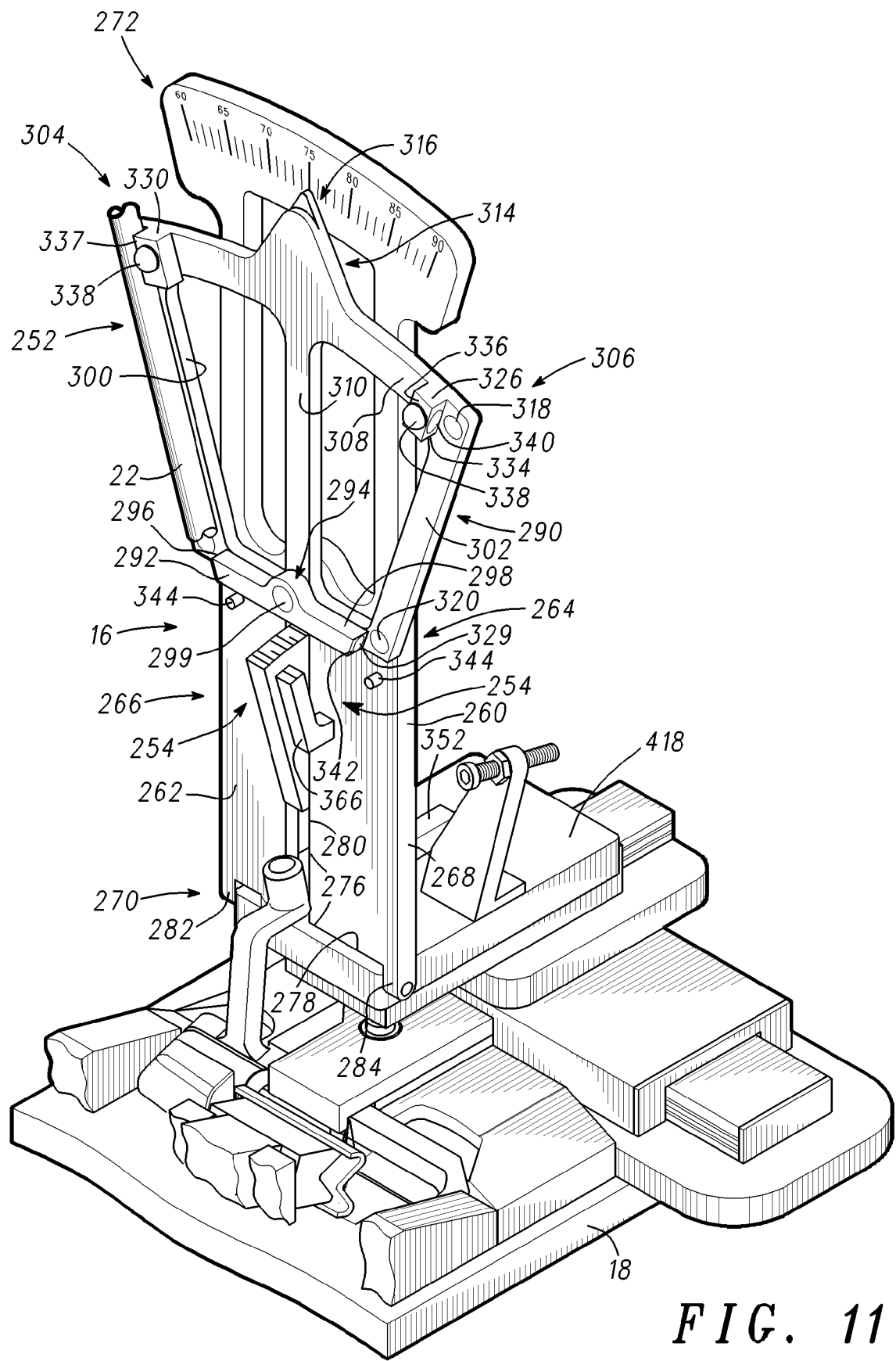
FIG. 11 is a cut-away perspective view of the loft and lie measurement tool of FIG. 1.

Referring now to FIG. 11, loft and lie measurement tool 10 further includes a loft and lie gauge 16 capable of indicating the loft angle of the club and the lie angle of the club. Loft and lie gauge 16 includes an indicator assembly 252 for displaying the lie angle of the golf club and an indicator assembly 254 for displaying the loft angle of the golf club. Indicator assembly 252 is also referred to as a lie angle indicator and indicator assembly 254 is also referred to as a loft angle indicator. For the sake of clarity, only a portion of golf club shaft 22 is shortened in FIG. 11.

Loft and lie gauge 16 comprises a metal plate 260 having opposing surfaces 262 and 264, opposing sides 266 and 268, a mating end 270, and an indicator end 272. An inverted "T" shaped slot 276 extends into metal plate 260 from mating end 270. Inverted "T" shaped slot 276 has a floor 278, a loft indicator notch 280, and arms 282 and 284. In accordance with one embodiment, loft indicator notch 280 is substantially perpendicular to floor 278 and substantially parallel to arms 282 and 284.

A lie angle pointer 290 is pivotably mounted to a portion of metal plate 260 that is above loft indicator notch 280. In accordance with one embodiment, lie angle pointer 290 comprises base member 292 having an attachment region 294 and end regions 296 and 298. A hole extends through attachment region 294 of base member 292 and a shaft of a bolt 299 is inserted through the hole in base member 292 and through a hole in metal plate 260. A spring (not shown) may be placed over the bolt shaft after which the bolt and spring are secured to metal plate 260 using a washer and a nut (not shown). The method for fastening lie angle pointer 290 to metal plate 260 is not a limitation of the present invention. Vertical members 300 and 302 extend from portions of metal plate 260 adjacent to end regions 296 and 298 of base member 292 and have end regions 304 and 306, respectively. A cross member 308 extends from end region 304 to end region 306. A vertical extension 310 may extend from attachment region 294 to a central portion 314 of cross member 308. A pointer 316 extends from central portion 314 in a direction away from base member 292 and cross member 308.

Magnets 318 and 320 are attached to portions of vertical member 302 near ends 306 and 298, respectively. Preferably, magnets 318 and 320 are attached to vertical member 302 so that they are flush with or recessed within its surface. It should be understood that magnets (not shown) are attached near ends 296 and 304 of vertical member 300 in a similar fashion as magnets 318 and 320, i.e., they are flush with or recessed within the surface of vertical member 300. Stops 326 and 330 extend from the ends of vertical members 300 and 302, respectively. In addition, ends 296 and 298 serve as shaft stops. Stop 326 has a mating surface 334 and a bumper surface 336, stop 298 has a mating surface 329, and stop 330 has a bumper surface 337. Magnets 340 and 342 are attached to stops 326 and 298, respectively. Preferably magnets 340 and 342 are attached such that they are flush or recessed within surfaces 334 and 329 of stops 326 and 298. It should be understood that magnets (not shown) are attached to stops 330 and 332 in a similar fashion as magnets 340 and 342 are attached to stops 326 and 298. Optionally, rubber stoppers 338 may be attached to surfaces 336 and 337.

Stopping pins 344 may be inserted in metal plate 260 below lie angle pointer 290 and adjacent slot 280. Stopping pins 344 stop lie angle pointer 290 from pivoting too far.

FIG. 11 further illustrates loft angle indicator assembly 254 positioned within loft indicator notch or slot 280. An expanded view of a portion of loft angle indicator assembly 254 is shown in FIG. 12. Thus, loft angle indicator 254 will be described with reference to FIGS. 11 and 12. Loft angle indicator assembly 254 comprises an L-shaped support piece 350 having a base portion 352 and a shaft portion 354 mounted to a support plate 418. Support plate 418 is further described with reference to FIG. 13. Base portion 352 is shown in FIG. 11. An inverted L-shaped gauge 360 having a shaft portion 362 and a gauge portion 364 is mounted to shaft portion 354. Gauge portion 364 is slightly arcuate and includes gradations indicating the loft angle. An L-shaped pointer 366 is attached to a portion of metal plate 260 adjacent gauge portion 364 for indicating the loft angle.

Figure 13:
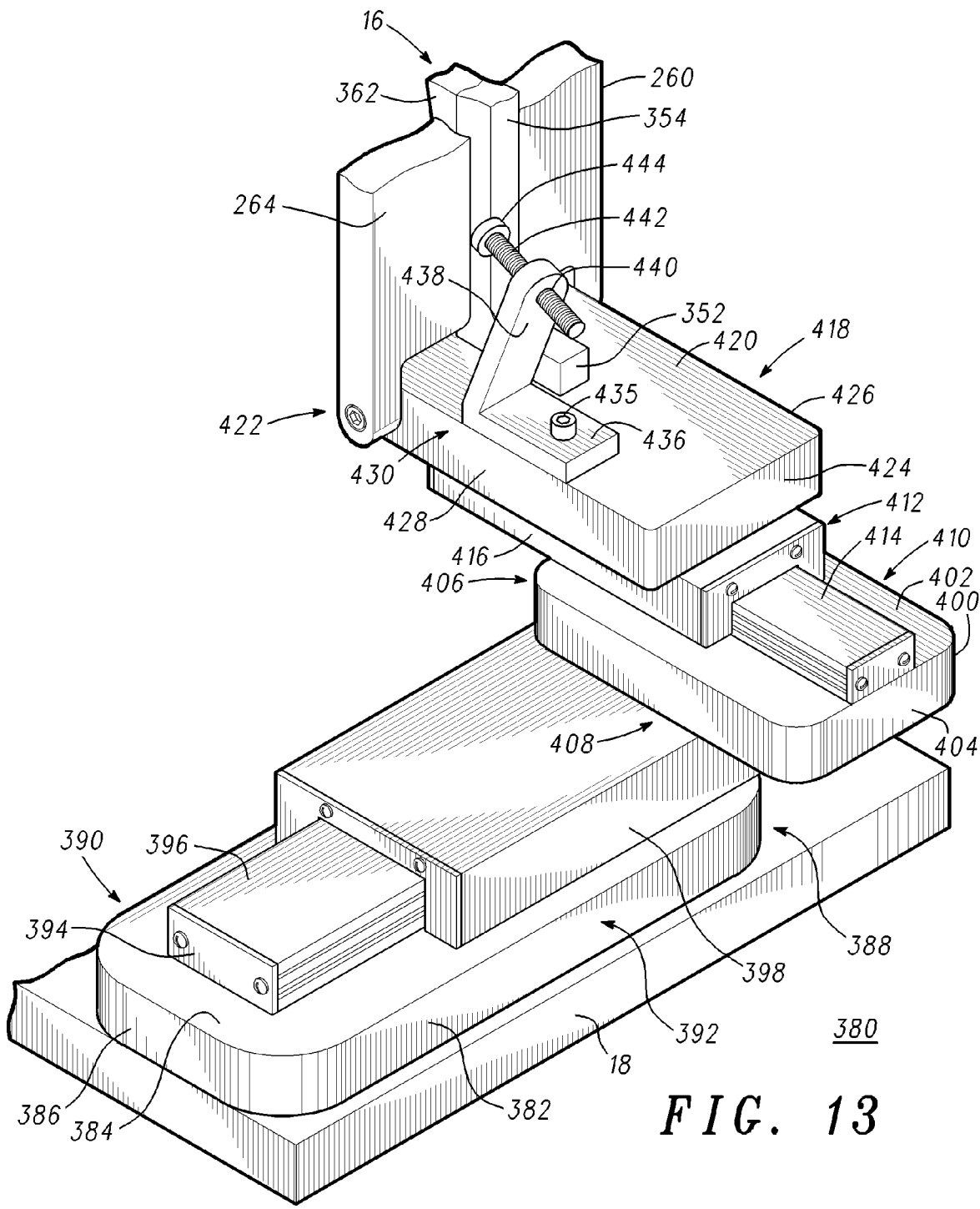
FIG. 13 is a perspective view of the loft and lie measurement tool of FIG. 1.

FIG. 13 is a perspective rear view of a loft and lie gauge 16 mounted to a mounting structure 380 which is mounted to base 18. Mounting structure 380 includes plate 382 mounted to base 18. Plate 382 has a surface 384, opposing sides 386 and 388, and opposing sides 390 and 392. By way of example, plate 382 is aluminum. A sliding or translational stage 394 is mounted to aluminum plate 382. Sliding stage 394 comprises a mounting portion 396 and a sliding portion 398. In accordance with one embodiment, sliding stage 394 is mounted such that sliding portion 398 moves in a direction substantially perpendicular to opposing sides 386 and 388 of aluminum plate 382. An aluminum plate 400 having a surface 402, opposing sides 404 and 406, and opposing sides 408 and 410 is mounted to sliding portion 398.

A sliding or translational stage 412 is mounted to aluminum plate 400. Sliding stage 412 comprises a mounting portion 414 and a sliding portion 416. In accordance with one embodiment, sliding stage 412 is mounted such that sliding portion 416 moves in a direction substantially perpendicular to opposing sides 404 and 406 of aluminum plate 400. An aluminum plate 418 having a surface 420, opposing sides 422 and 424, and opposing sides 426 and 428 is mounted to sliding portion 416. Although the material for plates 382, 400, and 418 have been described as being aluminum, this is not a limitation of the present invention. Suitable materials for plates or blocks 382, 400, and 418 include aluminum, stainless steel, titanium, or the like.

A stop 430 is mounted to aluminum block 418. Stop 430 comprises a bracket-type structure having a mounting portion 436 and a stopping portion 438. Mounting portion 436 is secured to block 418 by a screw 435. A threaded hole 440 is formed in stopping portion 438 and a screw 442 is screwed into threaded hole 440. A rubber stopper 444 is attached to one end of screw 442.

Figure 14:
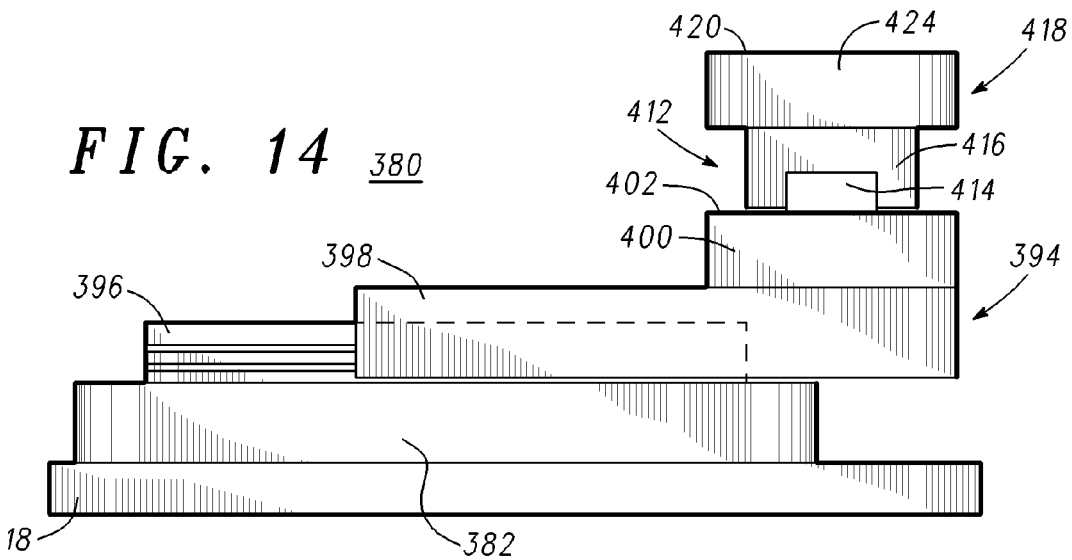
FIG. 14 is a rear perspective view of the loft and lie measurement tool of FIG. 13.

FIG. 14 is a rear perspective view of mounting structure 380 showing aluminum plate 382 mounted on base 18, sliding stage 394 mounted on aluminum plate 382, aluminum plate 400 mounted on sliding stage 394, sliding stage 412 mounted on aluminum plate 400, and aluminum plate 418 mounted on sliding stage 412.

In operation, club head 26 is positioned on beveled portions 184 of bevel support elements 180 and club shaft 22 is positioned against stops 296 and 330. If shaft 22 is a metal shaft, the magnets in stops 296 and 330 hold club shaft 22 in position. Fastening plate 176 is placed over club head 26 and secured in position using screw 214. Fastening plate 176 vertically secures club head 26 in place. Crank 43 is turned to push jaw 122 of mating element 50 against protective or elastic insert 27 thereby pushing it against club head 26 to laterally secure club head 26 to golf club head support structure 14. Once club head 26 is secured, the lie angle is measured using lie angle indicator assembly 252 and the loft angle is measure using loft angle indicator assembly 254 of loft and lie gauge 16.

By now it should be appreciated that a loft and lie measurement tool capable of measuring the loft angle, the lie angle, or both the loft and lie angles has been provided. An advantage of the loft and lie measurement tool is that it is portable. Loft and lie gauge 16 can be pivoted so that it rests on or above the pushing element and the mating element for ease of transport. Because the golf club is secured by the mating element, the clamping plate, and magnets located in stops formed in the lie angle indicator assembly, it provides extremely accurate loft and lie angle measurements. The loft and lie measurement tool can be configured for use with different golf clubs, i.e., left handed clubs, right handed clubs, center-shafted clubs, and different types of club heads such as, for example, putters and irons.

What is claimed is:

1. A measurement tool for determining at least one of a loft angle and a lie angle of a golf club, comprising:
a golf club head support structure having a mating surface and at least one support element having a beveled portion;
a clamping tool capable of securing the golf club head to the golf club head support structure;
and a gauge capable of indicating the at least one of the loft angle and the lie angle of the golf club;
a pushing element;
a mating element for securing the golf club head to the golf club head support structure;
the mating element including a first portion having a rectangular shape and a major surface, and a second portion extending from the first portion and having a mating side, the mating element further including a beveled region extending from the major surface of the first portion into the second portion; and
the mating element further including a mating element extender having a jaw.

2. The measurement tool of claim 1, wherein the golf club head support structure is a putter head support structure.

3. The measurement tool of claim 1, wherein the pushing element is connected to the mating element.

4. The measurement tool of claim 1, wherein the clamping tool further includes at least one guide pin extending from a first side of the clamping tool.

5. The measurement tool of claim 1, wherein the golf club head support structure further comprises at least one opening extending into the mating surface and wherein the at least one support element has a cylindrical portion that extends into the at least one opening.

6. The measurement tool of claim 5, wherein the beveled portion is a cylindrically beveled portion, an angle of the cylindrically beveled portion cooperating with an angle of the club head to form a substantially uniform contact between the club head and the at least one support element.

7. The measurement tool of claim 6, wherein the at least one support element and the at least one opening extending into the mating surface comprises two support elements and two openings extending into the mating surface, the two openings laterally spaced apart from each other.

8. The measurement tool of claim 1, wherein the golf club head support structure further includes a spring mounted retainer.

9. The measurement tool of claim 1, wherein the gauge comprises:
- a loft angle indicator assembly;
- a lie angle indicator assembly; and
- at least one stopping pin.

10. A tool for measuring at least one of a loft angle and a lie angle of a golf club, the apparatus comprising:
- a golf club support structure having a surface and a first opening extending from the surface into the golf club support structure;
- a first post having a beveled portion, the first post positioned in the first opening;
- a clamping plate coupled to the golf club support structure;
- a mating element having first and second opposing sides, the mating element capable of moving in the direction of the golf club support structure;
- a gauge adjacent the golf club support structure for measuring at least one of the loft angle and the lie angle; and
- the mating element having guideposts extending from the first and second opposing sides.

11. The tool of claim 10, further including a pushing element coupled to the mating element, the pushing element having first and second opposing sides and guideposts extending from the first and second opposing sides.

12. The tool of claim 11, further including a clamping jaw coupled to the mating element the clamping jaw for securing a golf club head to the golf club support structure.

13. The tool of claim 10, wherein the clamping plate has a beveled opening and wherein one side of the clamping plate has a keeper.

14. The tool of claim 10, wherein the gauge is capable of measuring the loft angle and the lie angle of the golf club.

15. The tool of claim 10, further including at least one magnet attached to the gauge.

16. A tool for measuring at least one of a loft angle and a lie angle of a golf club, the apparatus comprising:
- a golf club support structure having a surface and a first opening extending from the surface into the golf club support structure;
- a first post having a beveled portion, the first post positioned in the first opening;
- a clamping plate coupled to the golf club support structure;
- a mating element having first and second opposing sides, the mating element capable of moving in the direction of the golf club support structure;
- a gauge adjacent the golf club support structure for measuring at least one of the loft angle and the lie angle;
- the clamping plate having a beveled opening and one side of the clamping plate having a keeper;
- a second opening in the golf club support structure;
- a spring positioned within the second opening;
- an elongated beveled ring positioned in the beveled opening in the clamping plate; and
- a fastener extending through the elongated beveled ring, the opening in the clamping plate, the spring, and the second opening in the golf club support structure.

* * * * *